US008887280B1

(12) United States Patent
Dickinson et al.

(10) Patent No.: US 8,887,280 B1
(45) Date of Patent: Nov. 11, 2014

(54) DISTRIBUTED DENIAL-OF-SERVICE DEFENSE MECHANISM

(75) Inventors: Andrew Dickinson, Seattle, WA (US); Colin Whittaker, Seattle, WA (US); Kirk Petersen, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 167 days.

(21) Appl. No.: 13/476,856

(22) Filed: May 21, 2012

(51) Int. Cl.
*G06F 7/04* (2006.01)

(52) U.S. Cl.
USPC ............................................................ 726/23

(58) Field of Classification Search
USPC .......................................... 726/11–14, 22–25
See application file for complete search history.

(56) References Cited

U.S. PATENT DOCUMENTS

| | | | | |
|---|---|---|---|---|
| 6,587,438 | B1 * | 7/2003 | Brendel | 370/238 |
| 7,610,622 | B2 * | 10/2009 | Touitou et al. | 726/22 |
| 2002/0073345 | A1 * | 6/2002 | Esfahani | 713/202 |
| 2002/0083175 | A1 * | 6/2002 | Afek et al. | 709/225 |
| 2004/0008681 | A1 * | 1/2004 | Govindarajan et al. | 370/394 |
| 2004/0057384 | A1 * | 3/2004 | Le et al. | 370/252 |
| 2004/0187032 | A1 * | 9/2004 | Gels et al. | 713/201 |
| 2005/0144441 | A1 * | 6/2005 | Govindarajan | 713/160 |
| 2005/0166049 | A1 * | 7/2005 | Touitou et al. | 713/170 |
| 2006/0029000 | A1 * | 2/2006 | Waldvogel | 370/254 |
| 2006/0069804 | A1 * | 3/2006 | Miyake et al. | 709/237 |
| 2006/0230129 | A1 * | 10/2006 | Swami et al. | 709/223 |
| 2007/0033645 | A1 * | 2/2007 | Jones | 726/12 |
| 2007/0038677 | A1 * | 2/2007 | Reasor et al. | 707/200 |
| 2007/0201474 | A1 * | 8/2007 | Isobe | 370/392 |
| 2010/0161741 | A1 * | 6/2010 | Jiang et al. | 709/206 |
| 2010/0235902 | A1 * | 9/2010 | Guo et al. | 726/12 |
| 2011/0202972 | A1 * | 8/2011 | Jiang | 726/3 |

OTHER PUBLICATIONS

Fall (Fall et al., "TCP/IP Illustrated, vol. 1: The Protocols, Second Edition", ISBN 978-0-13-280820-0, Nov. 2011).*
RFC 1948 (Network Working Group Request for Comments: 1948, Bellovin, AT&T Research, May 1996).*
Eddy et al., The Internet Protocol Journal, vol. 9, Nr 4, Jan. 2009).*
Sairam et al., Defeating Reflector Based Denail-of-Service Attacks using Single Packet Filters, Communications and Networking in Chana (CHINACOM), 5th INternational ICST Conference, Aug. 2010.*
Onur, "Increasing Server Reliability and Performance Using Smart Gateways", Binghamton University State University of New York Dissertation, 2007.*
Quinn, Quinn et al., "Junos Security", O'reilly ISBN 978-1449381714, Sep. 2010.*

* cited by examiner

*Primary Examiner* — Peter Poltorak
(74) *Attorney, Agent, or Firm* — Baker & Hostetler LLP

(57) ABSTRACT

Denial-of-service protection for a computing device on a first network is disclosed. In an embodiment, a packet containing a network address corresponding to a computing device on the first network is received from a source address of a second network by a gateway device. The packet includes a request to initiate a connection to the computing device on the first network. In response, an acknowledgement is transmitted to the source address. The acknowledgement includes sequence information sufficient to establish the requested connection, including a unique identifier. Subsequently received packets addressed to the network address of the computing device are forwarded by the gateway device to a corresponding network address of the computing device on the first network upon verifying a response to the acknowledgement.

14 Claims, 5 Drawing Sheets

DISTRIBUTED DENIAL-OF-SERVICE DEFENSE MECHANISM

BACKGROUND

Providing defense mechanisms against computer hackers and attacks on computing infrastructure has been an increasingly significant concern with the growing importance of network-based computing. With the growth of network-based computing over the Internet and the growing reliance on cloud computing services, protecting computers and servers connected to a network from malicious network-based attacks has become a significant issue for businesses and organizations. For example, hackers may attack a computing service over a network using denial-of-service attacks. SYN flooding is a particularly popular denial-of-service tactic. In a SYN flood attack, an attacker sends a succession of SYN requests to a target system in an attempt to overwhelm the target system's resources so that it becomes unresponsive to legitimate requests. Computing service providers must account for and protect against such attacks while maintaining an effective level of service to their customers.

DETAILED DISCLOSURE

In general, this disclosure describes a system and method for implementing a denial-of-service protection mechanism. In various embodiments, a gateway device initially responds to client connection requests in order to prevent target systems (e.g., server computers) from receiving and being affected by malicious connection requests such as those associated with SYN Flood attacks. After responding to the client connection requests, the gateway device allows subsequent messages from the client to pass through to the server computers.

At a high level, a denial-of-service attack is an attempt to render a computing resource unavailable for its intended use. For example, a denial-of-service attack may attempt to interrupt services of a target system, e.g., a server computer, connected to the Internet. One method of implementing a denial-of-service attack is to overwhelm the target system with spurious connection requests so that the target system is unable to respond to normal traffic. Denial-of-service attacks attempt to force the target system to consume its resources on the spurious connection requests so that legitimate connection requests cannot be fulfilled and the target system can no longer provide its intended services.

Figure 1:
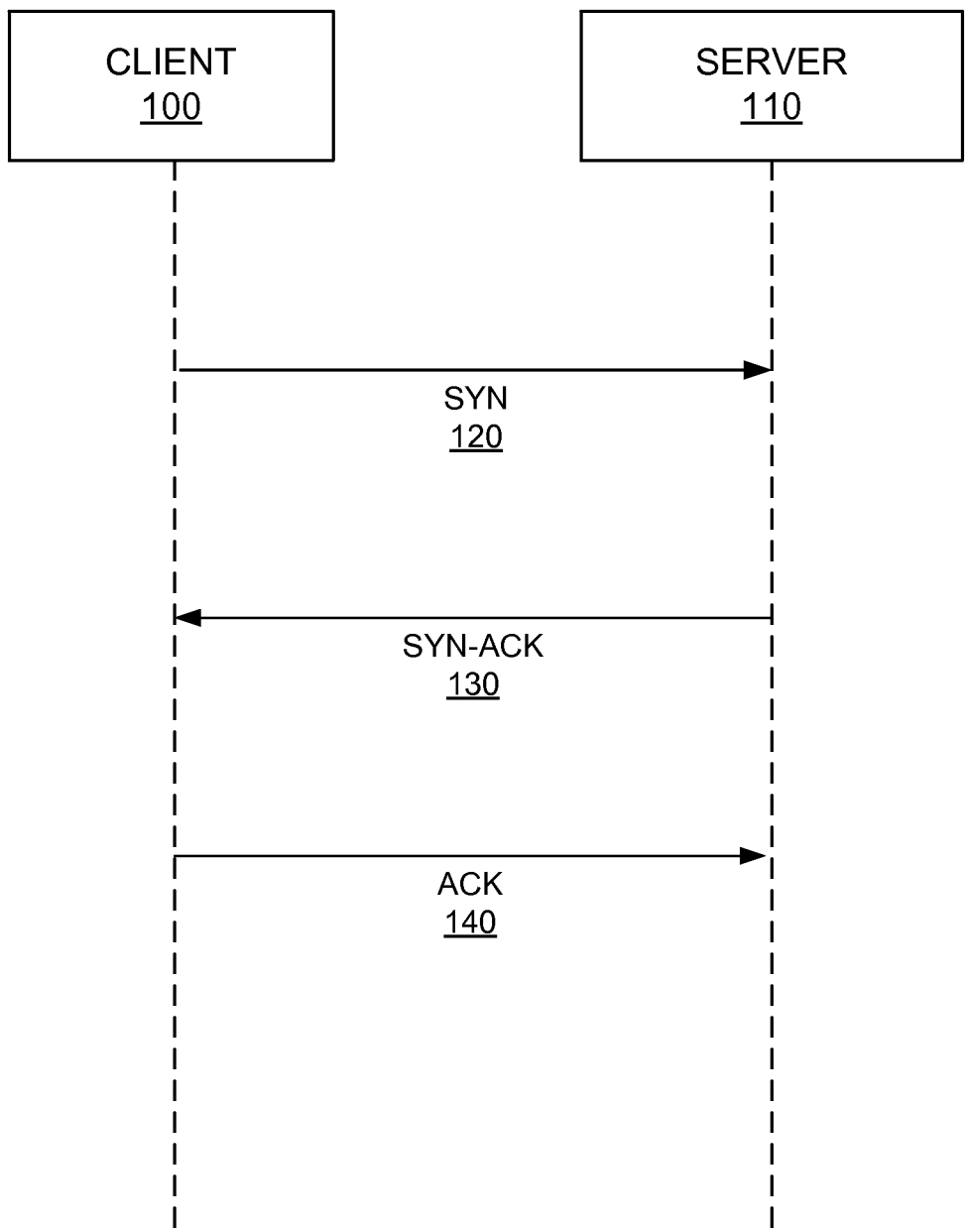
FIG. 1 is a diagram illustrating a TCP connection handshake.

In particular, a SYN flood attack is a form of a denial-of-service attack in the TCP/IP context. FIG. 1 provides a diagram illustrating a TCP connection handshake. When a client 100 initiates a TCP connection with a server computer 110, the client 100 and server computer 110 exchange a series of messages in accordance with the TCP protocol as follows:

1. The client 100 requests a connection by sending a SYN (synchronize) message 120 to the server computer 110.
2. The server computer 110 acknowledges the SYN message 120 by sending a SYN-ACK message 130 to the client 100.
3. The client 100 responds by returning an ACK message 140 to server computer 110.
4. Upon receipt of the ACK message 140 by the server computer 110, server computer 110 proceeds with establishing the connection.

In a SYN flood attack, an attacker sends a string of spurious SYN requests to a target system in an attempt to consume the target system's resources and render the target system unresponsive. Specifically, a SYN flood attack causes the target system to reserve resources for a large number of connections and wait for expected ACK messages that never arrive. For example, an attacker can send a string of SYN messages and (1) never send the expected ACK messages, or (2) spoof a source IP address in the spurious SYN messages with false source IP addresses. In the latter case, the target system sends SYN-ACK messages to the false IP addresses. Of course, since the false IP addresses did not actual send the initial SYN messages, no ACK messages are ever sent back to the target system.

In a normal TCP connection, when a client sends a SYN message to a server computer, the server computer typically binds a port in preparation for the connection. When the server computer generates a SYN-ACK message, the server computer also creates an entry in a SYN queue. A SYN queue is a queue for storing half-open connections awaiting TCP SYN handshake completion. During a SYN attack, the SYN queue entries continue to queue up due to the growing number of half open connections as the attacker continues to generate more spurious SYN packets that in turn take up more entries in the queue. A server computer typically waits for an expected ACK message for a specified timeout period before cancelling the connection request and recovering the connection resources. During that time, the attacker can continue to flood the server computer with more connection requests. Eventually the server computer will run out of available ports and will not accept any new connection requests without dropping connections from the queue, resulting in a denial-of-service to legitimate connection requests.

One countermeasure for guarding against denial-of-service attacks is the use of SYN cookies. This technique protects against a SYN flood attack by not allocating resources on the target system when SYN messages are received. In the SYN cookie technique, a server computer that receives a SYN message sends back a SYN-ACK response to the client but does not reserve any resources (e.g., does not bind a port in preparation for the connection) and does not enter a SYN queue entry. However, the SYN-ACK message encodes information that can be used to recover the connection information if needed. If the server computer subsequently receives a legitimate ACK response from the client, the server computer reconstructs the connection information using the information encoded in the SYN-ACK response and establishes the connection.

More specifically, when establishing a normal TCP connection, the SYN-ACK response includes a sequence number that, per the TCP protocol, can be any value as determined by the server computer. The client, in response to receiving the SYN-ACK, will increment (i.e., add 1) to the received sequence number and include the incremented sequence number in the ACK message.

In the SYN cookie technique, the sequence number in the SYN-ACK response is specially constructed so that it can be used to reassemble the connection information if needed. For example, the sequence number may be a 32 bit number generated by concatenating a time stamp, a maximum segment size (MSS) value that the server computer would have stored as the SYN queue entry, and a unique identifier (e.g., a unique number that is only known to the gateway device and the server computers, or the output of a cryptographic function computed over the server IP address and port number), the client IP address and port number, and the time stamp.

When a client sends an ACK message to the server computer in response to the server computer's SYN-ACK message, the client adds the value 1 to the sequence number contained in the SYN-ACK message and includes the incremented sequence number in the ACK message. When the server computer receives the ACK message from the client, the server computer subtracts 1 from the incremented sequence number to recover the initial sequence number sent to the client. The server computer may then check the time stamp against the current time to determine if the connection is expired. The server computer may also check if the unique identifier returned in the ACK message matches the unique identifier sent in the SYN-ACK message. If a cryptographic function was used, then the server computer may recompute the output of the cryptographic function to determine whether the output received in the SYN-ACK message matches the recomputed output and is therefore valid. The server computer also decodes the MSS value from the received sequence number and uses it to reconstruct the SYN queue entry. The requested TCP connection can then be established per the normal process.

Various aspects of the disclosure will now be described with regard to certain examples and embodiments, which are intended to illustrate but not to limit the disclosure.

Figure 2:
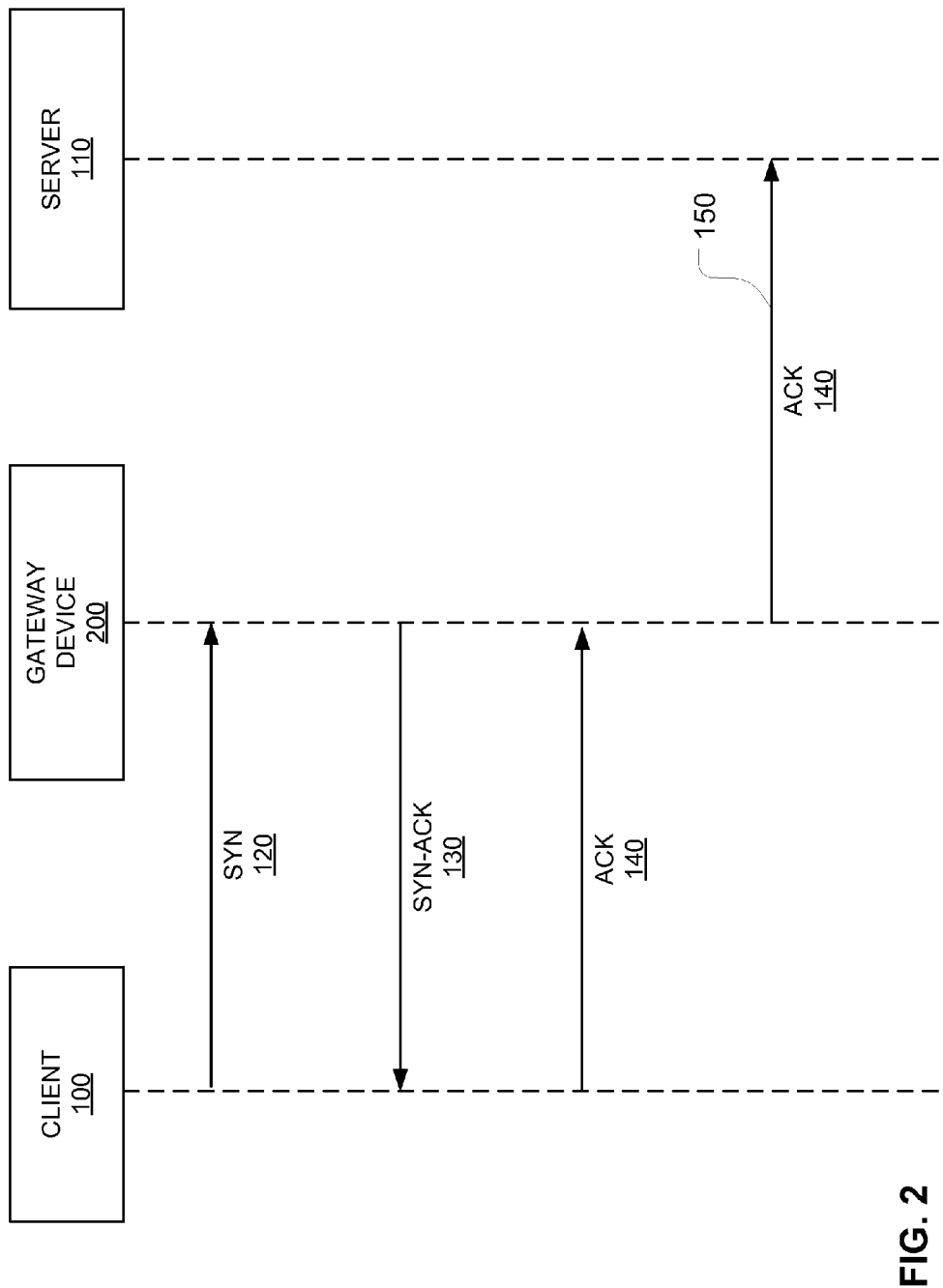
FIG. 2 is a diagram illustrating a denial-of-service defense mechanism in accordance with the present disclosure.

FIG. 2 is a diagram illustrating a denial-of-service defense mechanism in accordance with the present disclosure. In one embodiment, a gateway device 200 may be used to respond to a SYN message 120. Gateway device 200 may be any device communicatively coupled to a network that includes the server computer that will host a valid requested TCP connection. Gateway device 200 may be configured to receive and process packets and manage the routing of packets between private IP addresses in the local network and public IP addresses. An IP address is an example of a network address that is particularly applicable to the TCP/IP context in which SYN flood attacks typically occur. For example, gateway device 200 may be a high-performance stateless device employed at the edge of the local network. Such a device may be particularly suitable for efficiently handling TCP SYN messages because the stateless device treats each message as an independent transaction that is unrelated to previous transactions. The stateless device therefore need not retain session information or status about each communications session for the duration of the session, thus being particularly suited for handling multiple SYN messages in a SYN flood situation. However, the present disclosure is not limited to stateless machines. In some embodiments stateful devices may be used to handle SYN messages. More details regarding gateway device 200 are provided below.

In an embodiment, gateway device 200 may be used to respond to SYN message 120 by generating SYN-ACK message 130 including a sequence number that encodes connection information as described above. Gateway device 200 can generate and send SYN-ACK message 130 to the client 100, the message including the time stamp, MSS, and the unique identifier. In this embodiment, gateway device 200 has access to or possesses the same unique identifier or the same cryptographic function used by server computer 110. The unique identifier or cryptographic function is shared between gateway device 200 and server 110 so that server computer 110 can identify and act upon legitimate ACK messages that are passed through by gateway device 200.

Gateway device 200 may receive ACK message 140 and allow it to pass through to the server computer 110, which can then verify that ACK message 140 is valid by checking the time stamp to determine that the connection request has not timed out and that the unique identifier matches the unique identifier that was originally sent in SYN-ACK message 130, or that the output of the cryptographic function is valid. Server computer 110 may then establish the requested connection. Since ACK 140 includes the sequence number that includes connection information such as the server IP address and port number and the client IP address and port number, the server computer 110 can recover this information to establish the requested connection. Systems using the TCP SYN cookie method in this distributed manner need not bind resources and save connection states until an ACK with a valid sequence number is received.

By using the approach described herein, server computer 110 will not be exposed to spurious SYN packets during a SYN attack and gateway device 200 can be allowed to generate SYN-ACK responses. Such a mechanism can be particularly useful in preventing server computers from expending unnecessary resources due to denial-of-service attacks and implementing mechanisms to prevent such attacks. For example, by using the methods described herein, server computers need not receive nor respond to initial SYN packets, thus preserving computing and networks resources for legitimate connection requests. Although the SYN cookie method can be directly implemented by the server computers, the generation of SYN cookies nevertheless expends valuable computing and network resources. By pushing SYN cookie processing to a gateway device, server computers need not generate SYN cookies, thus allowing for the server computers to preserve resources for client services and other value added tasks.

The disclosed embodiments may be particularly useful in situations where computer data centers provide computing resources to clients. Many companies and organizations operate computer networks that interconnect multiple computing systems. For example, computer data centers housing large numbers of interconnected computing systems have become commonplace, such as in private and public data centers.

Figure 3:
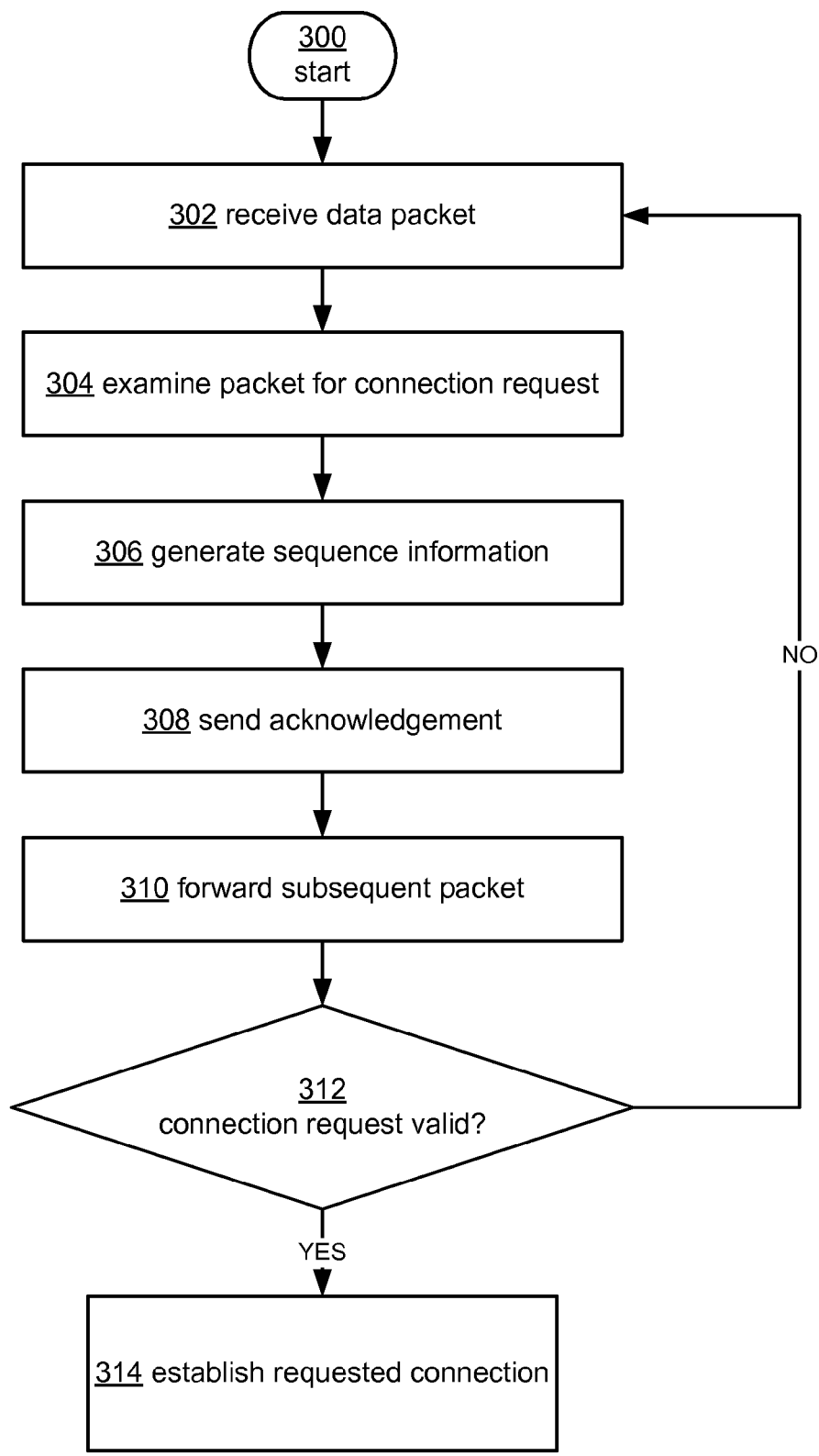
FIG. 3 is a flowchart of one embodiment of a process for providing denial-of-service protection to a server computer on a private network.

FIG. 3 illustrates an example operational procedure for providing denial-of-service protection to a server computer on a second network (e.g., a private network) where packets used in the denial-of-service attack originate from one or more computers on a first network (e.g., a public network). Referring to FIG. 3, operation 300 begins the operational procedure. Operation 300 may be followed by operation 302. Operation 302 illustrates receiving a data packet. The data packet may be received from the first network and may contain an IP address in the packet's destination address corresponding to a computing device (such as a server computer) on the second network. The data packet may be processed by forwarding the data packet to the computing device corresponding to the IP address. As discussed above, an IP address is an example of a network address that is particularly applicable to the TCP/IP context in which SYN flood attacks occur. The packets can be forwarded to the computing device by way of a number of mechanisms. For example, the IP address in the packet's destination address can be changed to the IP address of the computing device. In another example, the MAC address of the computing device on the second network can be used to forward packets. Other forwarding mechanisms could also be used and are contemplated herein.

Operation 302 may be followed by operation 304. Operation 304 illustrates examining packets received from a source address of the first network for a packet containing a request to initiate a connection to a server computer on the second network. In one embodiment, the requested connection may be a TCP connection and the request may be in the form of a TCP SYN message.

Operation 304 may be followed by operation 306. Operation 306 illustrates generating sequence information sufficient to establish the requested connection in response to receiving the packet containing the request to initiate the connection. The sequence information may include a unique identifier. In an embodiment, the sequence information may be a SYN-ACK message and the sequence information may be a TCP sequence number. The unique identifier may, in some embodiments, include the result of a cryptographic function computed over the server IP address and port number and may also include a time stamp. Operation 306 may be followed by operation 308. Operation 308 illustrates transmitting to the source address of the first network a packet containing the acknowledgement of the request to initiate the connection.

Operation 308 may be followed by operation 310. Operation 310 illustrates receiving and forwarding subsequent packets addressed to the IP address of the server computer. Operation 310 may be followed by operation 312. In an embodiment, the subsequently received packets may be processed by determining whether the packet includes a valid response to the acknowledgement sent in operation 308. Operation 312 may be followed by operation 314. In operation 314, if it is determined that a valid response to the acknowledgement has been received, then the connection requested by the connection request of operation 304 is valid and is established. In one embodiment, the response to the acknowledgement is determined to be valid if the response contains the unique identifier. If it is determined that the connection request is not valid, then operation 312 may be followed by operation 302.

In one embodiment, some connection requests may be processed by the gateway device and some connection requests may be locally processed by one or more of the server computers. For example, it may be determined, based on one or more criteria, that certain source IP addresses are trustworthy and that connection requests originating from those source IP addresses may be processed directly by the back-end server computers. For example, some source IP addresses may be associated with customers or trusted sources and connection requests from those sources may be processed directly by the appropriate server computers. By allowing connection requests from trusted source IP addresses to be processed directly by the server computers, the distribution of tasks may be more efficiently balanced between the gateway device and the server computers.

Similarly, it may be determined that analysis of certain data traffic indicates, based on one or more criteria, that a potential denial-of-service attack exists and that the gateway device should perform SYN cookie processing for data traffic originating from the suspect IP addresses. For example, criteria that a potential denial-of-service attack exists can include an identifiable pattern with which a number of SYN requests have been received, or an identifiable increase in the number of SYN requests beyond a specified threshold. If it is later determined that the threat has subsided, then the suspect IP addresses may be considered "safe" and connection requests originating from these IP addresses may again be processed directly by the server computers.

In some embodiments, determinations as to whether some or all incoming SYN requests should be processed by the gateway device may be made in real time or near real time as network conditions and data traffic analysis indicates. For example, a block of suspect IP addresses may be identified as a potential source of denial-of-service attacks and all SYN requests originating from the identified block of addresses may be processed by gateway device 200. For example, it may be determined that certain addresses have been identified with previous SYN flood attacks. In addition, in conjunction with the change in status of various IP addresses, the server computers may be configured to handle some or all SYN requests for processes that are hosted on the respective server computers.

Figure 4:
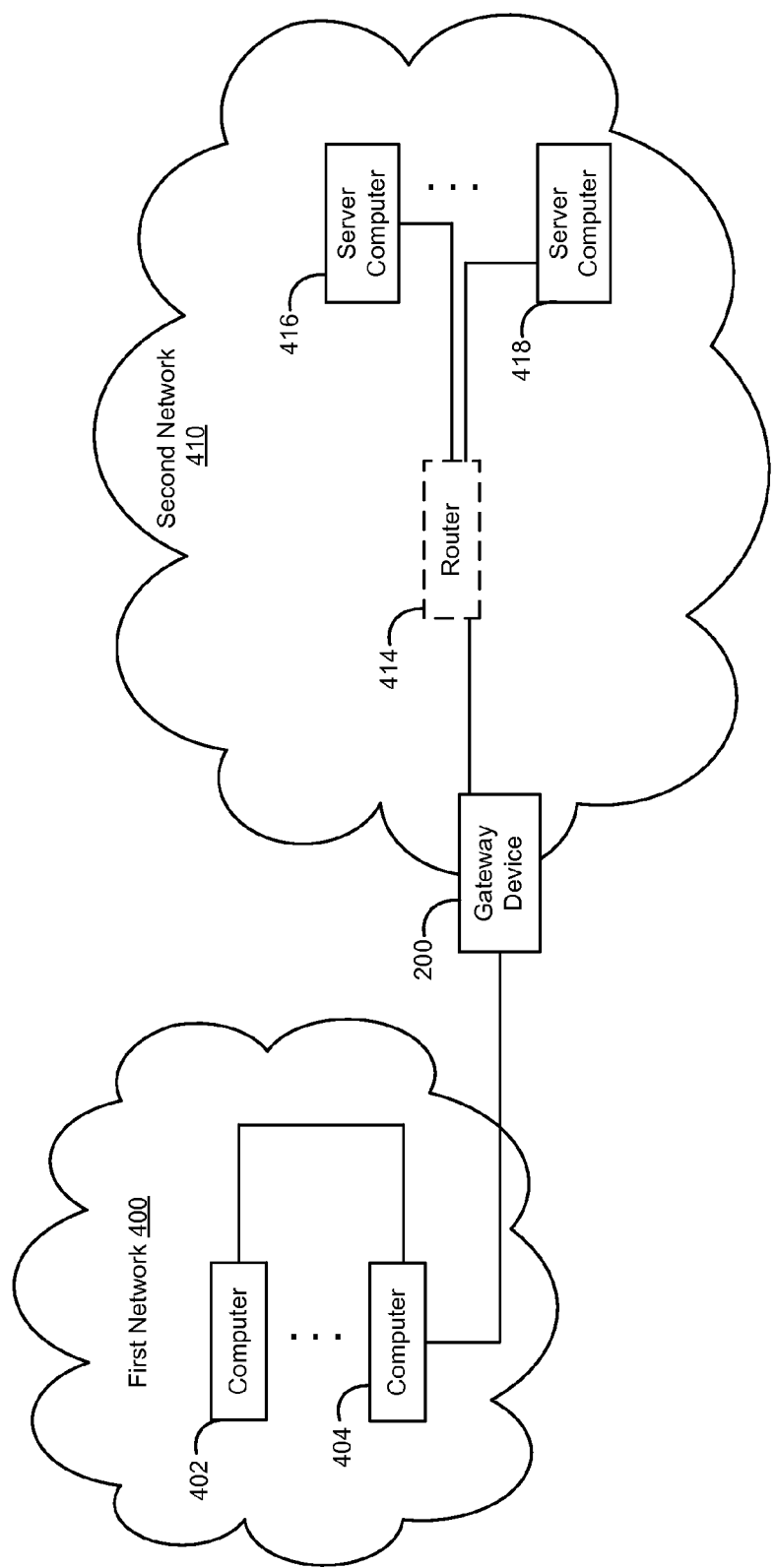
FIG. 4 is a block diagram illustrating an exemplary computer system that may be used in some embodiments.

FIG. 4 depicts an example computing environment wherein aspects of the present disclosure can be implemented. The availability of virtualization technologies for computing hardware has provided benefits for managing large scale computing resources for customers and allowing computing resources to be efficiently and securely shared between multiple customers. For example, virtualization technologies such as those provided by VMWare or other virtualization systems may allow a physical computing device to be shared among multiple users by providing each user with one or more virtual machines hosted by the physical computing device. A virtual machine may be a software emulation of a particular physical computing system that acts as a distinct logical computing system. Such a virtual machine provides isolation among multiple operating systems sharing a given physical computing resource. Furthermore, some virtualization technologies may provide virtual resources that span one or more physical resources, such as a single virtual machine with multiple virtual processors that spans multiple distinct physical computing systems.

In some cases, a group of computers may form part of one or more networks. The networks can, in some embodiments, be public, private, or a combination thereof. In some embodiments, a gateway device as discussed above may be used to provide network address translation (NAT) functionality to a group of computers that share one or more networks and allow the computers of the group to use a first group of internal network addresses to communicate over the shared network and to use a second group of one or more other external network addresses for communications between computers of the group and other computing systems that are external to the group. An IP address is one example of a network address that is particularly applicable to the TCP/IP context in which some embodiments of the present disclosure can be implemented. The use of IP addresses herein is intended to be illustrative of network addresses and not limiting as to the scope of the described concepts.

FIG. 4 illustrates one example of an environment including a group of computing systems that share a common network in which aspects of the present disclosure may be implemented. As shown in FIG. 4, the example includes a second network 410 that includes server computers 416 and 418. In particular, second network 410 may be connected to a first network 400 external to second network 410. First network 400 may provide access to computers 402 and 404.

First network 400 may be, for example, a publicly accessible network made up of multiple networks operated by various entities such as the Internet. Second network 410 may be, for example, a company network that is wholly or partially inaccessible from computing systems external to second network 410. Computers 402 and 404 may include, for example, home computing systems that connect directly to the Internet (e.g., via a cable modem or a Digital Subscriber Line (DSL)).

In addition to server computers 416 and 418 of second network 410, second network 410 may include a gateway 200 as discussed above. Second network 410 may further include additional networking devices such as a router 414. Router 414 may manage communications within second network 410, for example by forwarding packets or other data communications as appropriate based on characteristics of such communications (e.g., header information including source and/or destination addresses, protocol identifiers, etc.) and/or the characteristics of the second network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

Referring to FIG. 4, server computers 416 and 418 are part of second network 410, and each server computer may be assigned a network address (not shown) in accordance with second network 410. For example, the second network addresses may be unique with respect to the second network but not guaranteed to be unique with respect to other computing systems that are not part of second network 410. As one example, Internet Protocol (IP) and other networking protocols may reserve groups or blocks of network addresses, with such reserved network addresses not being routable over networks external to the second network. In such situations, different networks may each use the same network addresses within their networks, as the network addresses are locally unique to each network, but those network addresses may not be used for communications between a computing system of a different network and another computing system external to the network. IP addresses are used to illustrate some example embodiments in the present disclosure. However, it should be understood that other network addressing schemes may be applicable and are not excluded from the scope of the present disclosure.

In this example, to facilitate communications between server computers 416 and 418 of second network 410 and other external computing systems that are not part of second network 410 (e.g., computers 402 and 404 and/or other computing systems that are part of first network 400), one or more gateway devices 200 may be used. In particular, one or more first network addresses (not shown) may have previously been assigned for use in representing second network 410. Such first network addresses may be routable over the Internet such that a communication that is sent by external computer 402 and that has one of second network 410's first network addresses as its destination network address will be routed over the Internet to gateway device 200. Furthermore, additional gateway devices (not shown) may be provided as needed.

Gateway device 200 may operate to manage both incoming communications to the second network 410 from first network 400 and outgoing communications from second network 410 to first network 400. For example, if server computer 416 sends a message (not shown) to one of computers 402 in first network 400, server computer 416 may create an outgoing communication that includes an external first network address (e.g., a public IP address) for computer 402 as the destination address and include a second network address (e.g., a private IP address) for server 416 as the source network address. Router 414 then uses the destination address of the outgoing message to direct the message to gateway device 200 for handling. In particular, in order to allow computer 402 to reply to the outgoing message, gateway device 200 may temporarily map one of the public network addresses for second network 410 to server computer 416 and modify the outgoing message to replace the source network address with the mapped first network address. Gateway device 200 may then update its mapping information with the new mapping, and forward the modified outgoing message to the destination computer 402 over the Internet.

If computer 402 responds to the modified outgoing message by sending a response incoming message (not shown) that uses the mapped first network address for server computer 416 as the destination network address, the response incoming message may be directed over the Internet to gateway device 200. Gateway device 200 may then perform similar processing in reverse to that described above for the outgoing message. In particular, gateway device 200 may use its mapping information to translate the mapped first network address into the second network address of server 416, modify the destination network address of the response incoming message from the mapped first network address to the second network address of server computer 416, and forward the modified incoming message to server computer 416. In this manner, at least some of the internal computers of second network 410 may communicate with external computing systems via temporary use of the first network addresses. Furthermore, in some situations, one or more of the internal computing systems of second network 410 may be mapped to use one of the first network addresses (e.g., to a unique combination of a first network address and a port number), such that external computing systems may initiate new incoming messages to the internal computing system by directing the new incoming messages to the mapped representative first network address/port as the destination network address of the new incoming messages.

Figure 5:
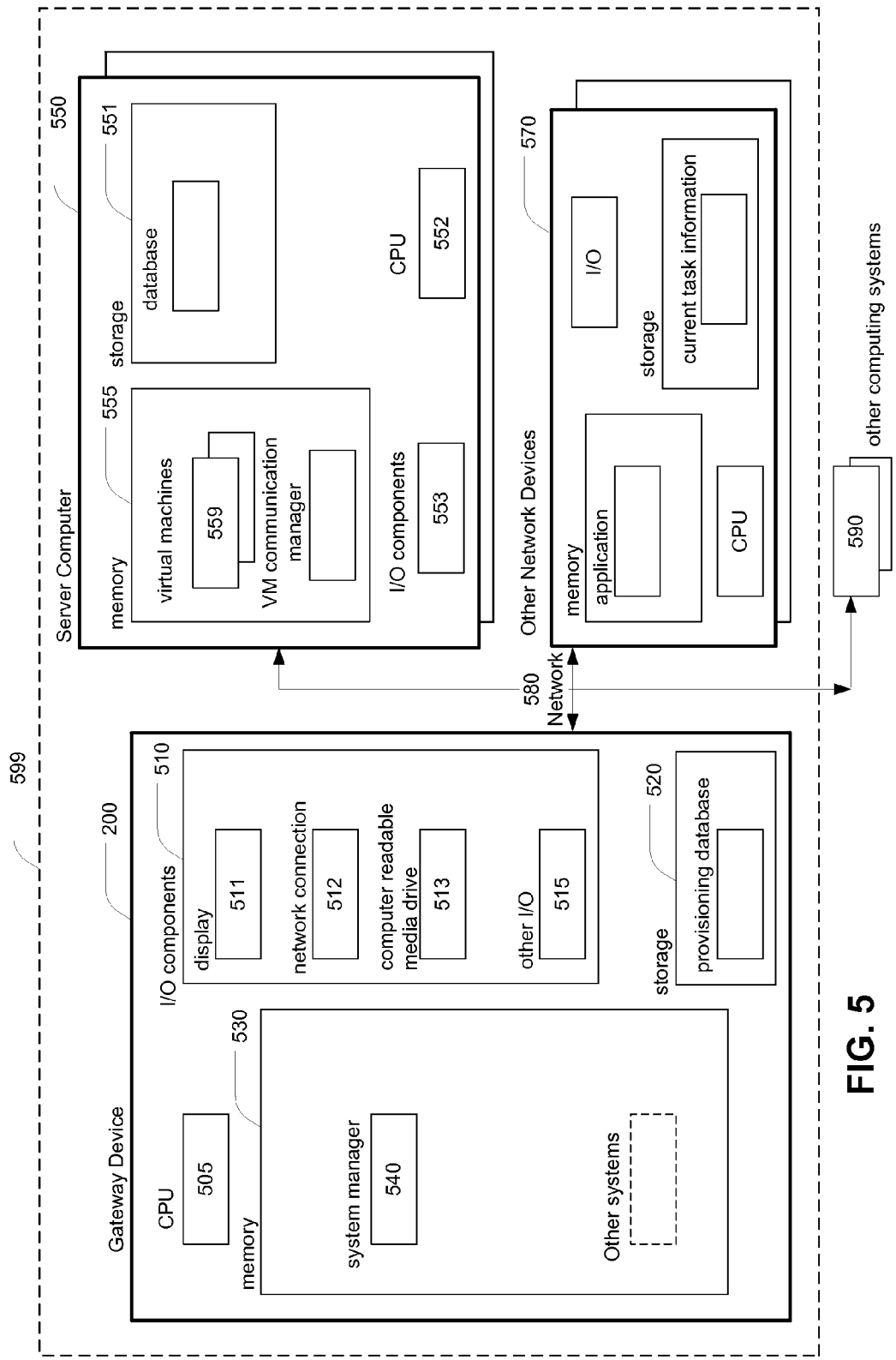
FIG. 5 is a block diagram illustrating an exemplary computer system that may be used in some embodiments.

FIG. 5 is a block diagram illustrating an exemplary architecture that is an example configuration applicable to some embodiments. In particular, FIG. 5 illustrates a group 599 of networked server computers that may, for example, be part of a data center or computing nodes of a private network. Group 599 may include one or more server computers 550. Server computers 550 may provide computing services to clients and may also be configured to execute one or more virtual machines 559. Server computers 550 may be connected to an internal network 580 that includes gateway device 200 as well as other networking devices 570. Network 580 may further provide access to external networks (not shown) and/or external systems, such as computing systems 590. As illustrated in this example, gateway device 200 may generate SYN-ACK messages in response to SYN messages received over network 580 from external computing systems 590 using the methods described above. Accordingly, server computers 550 and/or virtual machines 559 executing on the server computers 550 may correspond to the destination addresses contained in the SYN messages.

Server computer 550 may host one or more virtual machines 559 that operate as computing nodes that are part of a private network. Server computer 550 may include a CPU 552, various I/O components 553, storage 551, and memory 555. A virtual machine (VM) communication manager module 556 and one or more virtual machines 559 may execute in memory 555, with the VM communication manager module 556 managing at least some outgoing communications for associated virtual machines 559. The structure of other computing systems 590 may be similar to that of server computer 550. Group 599 may include additional server computers 550 such as those illustrated here.

Gateway device 200 may include a CPU 505, various I/O components 510, storage 520, and memory 530. The I/O components 510 may include a display 511, network connection 512, computer-readable media drive 513, and other I/O devices 515 (e.g., a mouse, keyboard, etc.).

In various embodiments, gateway device 200, in conjunction with communication modules within the computing group 599 (not shown) and various networking devices 570 may interact in various ways to manage communications for one or more server computers 550 and one or more virtual machines 559. Such interactions may, for example, enable server computers 550 and virtual machines 559 and/or other computing nodes to communicate over one or more internal networks for group 599, such as by assigning private network addresses to the computing nodes, and sharing information about mapped public network addresses that correspond to private network addresses.

It will be appreciated that server computer 550 and gateway device 200 are merely illustrative and are not intended to limit the scope of the present invention. For example, server computer 550 and/or gateway device 200 may be connected to other devices that are not illustrated, including through one or more networks external to the group 599, such as the Internet or via the World Wide Web. More generally, a server computer, computing node, gateway device, or other computing system may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations. For example, the methods and systems described herein for providing denial-of-service protection to a server computer on a private network may be performed by devices other than computing systems and gateway devices. For example, the described processes may be performed in part or in whole by other network devices and peripherals such as a network interface card (NIC) or any other device configured to perform such functionality.

In some embodiments, system memory 530 or 555 may be one embodiment of a computer readable storage medium configured to store program instructions and data as described above for FIGS. 1-4 for implementing embodiments of the corresponding methods and apparatus. However, in other embodiments, program instructions and/or data may be received, sent or stored upon different types of computer-accessible media. Generally speaking, a computer readable storage medium may include non-transitory and tangible storage media or memory media such as magnetic or optical media, e.g., disk or DVD/CD coupled to computer system 550 or gateway device 200. A computer readable storage medium may also include any volatile or non-volatile media such as RAM (e.g. SDRAM, DDR SDRAM, RDRAM, SRAM, etc.), ROM, etc., that may be included in some embodiments of computer system 550 as system memory 555, gateway device 200 as memory 530, or another type of memory. Portions or all of the multiple computer systems such as those illustrated in FIG. 5 may be used to implement the described functionality in various embodiments; for example, software components running on a variety of different devices and servers may collaborate to provide the functionality.

It will be appreciated that in some embodiments the functionality provided by the routines discussed above may be provided in alternative ways, such as being split among more routines or consolidated into fewer routines. Similarly, in some embodiments, illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, in other embodiments the operations may be performed in other orders and in other manners. Similarly, the data structures discussed above may be structured in different ways in other embodiments, such as by having a single data structure split into multiple data structures or by having multiple data structures consolidated into a single data structure, and may store more or less information than is described (e.g., when other illustrated data structures instead lack or include such information respectively, or when the amount or types of information that is stored is altered).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for providing denial-of-service protection during a SYN flood attack, the system comprising a gateway device configured to:
    process, at a second network by the gateway device, received data packets from a first network by forwarding on the second network the received data packet to a computing device corresponding to the IP address in the packet's destination address;
    examine, by the gateway device, the received packets for a packet containing a request to initiate a connection to the computing device on the second network;
    in response to receiving the packet containing the request to initiate the connection, transmit, by the gateway device at the second network, to the source address of the first network a packet containing an acknowledgement of the request to initiate the connection, the acknowledgement comprising sequence information sufficient to establish the requested connection with the computing device on the second network, the sequence information including a unique identifier that is generated using a function shared by the computing device and the gateway device, wherein the function is changed on a periodic basis; and
    process, by the gateway device at the second network, subsequently received packets from the source address of the first network addressed to the computing device by forwarding the subsequently received packets to the IP address of the computing device on the second network for processing by the computing device;
wherein:
    the packet containing the request to initiate the connection is not forwarded to the IP address of the computing device on the second network;
    the subsequently received packets from the source address of the first network addressed to the computing device on the second network is forwarded to the computing device on the second network for processing by the computing device only when a response to the acknowledgement comprising sequence information is received by the gateway device; and
    the response to the acknowledgement is verified by determining that the response includes an incremented sequence number.

2. The system according to claim 1, wherein the computing device on the second network is configured to establish the requested connection in response to receiving a packet containing the sequence information including the unique identifier, the requested connection established using the sequence information.

3. The system according to claim 1, wherein the gateway device is a stateless network edge device.

4. The system according to claim 1, wherein a third computing device on the second network is configured to, independent of the gateway device:
    process a second request to initiate a connection;
    generate the acknowledgement of the second request to initiate a connection without saving the second request to initiate a connection, the acknowledgement including second sequence information including a second unique identifier; and
    establish the requested connection when a subsequently received packet contains the second sequence information including the second unique identifier.

5. A method for providing denial-of-service protection, comprising:
    receiving, at a second network from a source address of a first network, a packet containing an address in the packet's destination address corresponding to a computing device on the second network, the packet containing a request to initiate a connection to the computing device on the second network;
    in response to receiving the packet containing the request to initiate the connection, transmitting, from the second network to the source address of the first network, a packet containing an acknowledgement of the request to initiate the connection, the acknowledgement comprising sequence information sufficient to establish the requested connection, the sequence information including a unique identifier that is generated using a function shared by the computing device and a gateway device configured to perform said receiving and said transmitting, wherein the function is changed on a periodic basis; and processing, at the second network, subsequently received packets from the source address of the first network addressed to the computing device by forwarding the subsequently received packets to the computing device on the second network;

wherein:

the packet containing the request to initiate the connection is not forwarded to the computing device on the second network for processing by the computing device when a response to the acknowledgement comprising sequence information is not received;

the subsequently received packets from the source address of the first network addressed to the computing device is forwarded by the gateway device to the computing device when a response to the acknowledgement comprising sequence information is received; and the response to the acknowledgement is verified by determining that the response includes an incremented sequence number.

6. The method of claim 5, wherein the response to the acknowledgement is further verified by determining that the response includes the sequence information including the unique identifier.

7. The method of claim 5, wherein the requested connection is established using the sequence information.

8. The method of claim 5, wherein the requested connection is for a TCP connection, the request is a SYN message, the acknowledgement is a SYN-ACK message, and the response to the acknowledgement is an ACK message.

9. The method of claim 5, wherein the request includes a source identifier and a port identifier.

10. The method of claim 5, wherein said transmitting the packet containing the acknowledgement of the request is selectively performed for connection requests matching at least one criterion.

11. A computer-readable storage medium having stored thereon computer-readable instructions, the computer-readable instructions comprising instructions that upon execution on a computing node, at least cause:

in response to receiving a request at a first network from a second network to initiate a connection to a computing device on the first network, transmitting an acknowledgement of the request to initiate the connection, the acknowledgement comprising sequence information sufficient to establish the requested connection, the sequence information including a unique identifier that is generated using a function shared by the computing device and a gateway device, wherein the function is changed on a periodic basis, wherein:

the request is received from a source address of the second network;

the request contains an IP address in the request's destination address; and the IP address corresponds to the computing device on the first network; and forwarding subsequently received packets from the source address of the second network addressed to the computing device on the first network;

wherein:

the packet containing the request to initiate the connection is not forwarded to the computing device on the first network;

the subsequently received packets from the source address of the second network addressed to the computing device on the first network are forwarded to the computing device on the first network when a response to the acknowledgement comprising sequence information is received;

the response to the acknowledgement is verified by determining that the response includes an incremented sequence number; and said gateway device is configured to forward the subsequently received packets.

12. The computer-readable storage medium of claim 11, wherein the requested connection is a TCP connection, the request is a SYN message, the acknowledgement is a SYN ACK message, and the response to the acknowledgement is an ACK message.

13. The computer-readable storage medium of claim 11, wherein the function is a cryptographic function.

14. The computer-readable storage medium of claim 12, wherein the request includes a source identifier and a port identifier.

* * * * *